(12) United States Patent
Ishitobi et al.

(10) Patent No.: US 7,218,586 B2
(45) Date of Patent: May 15, 2007

(54) INTERMITTENT OPTICAL DISC RECORDING METHOD AND OPTICAL DISC DRIVE SPLITTING DATA

(75) Inventors: Tatsuya Ishitobi, Kawasaki (JP); Hiroaki Ono, Mito (JP); Hisataka Sugiyama, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/218,580

(22) Filed: Sep. 2, 2005

(65) Prior Publication Data

US 2006/0007823 A1    Jan. 12, 2006

Related U.S. Application Data

(63) Continuation of application No. 10/095,663, filed on Mar. 8, 2002, now Pat. No. 6,954,411.

(30) Foreign Application Priority Data

Nov. 14, 2001    (JP)    ............................. 2001-348166

(51) Int. Cl.
*G11B 7/00*    (2006.01)
*G11B 7/125*    (2006.01)

(52) U.S. Cl. ................. 369/47.51; 369/53.26; 369/47.11

(58) Field of Classification Search ............... None
See application file for complete search history.

(56) References Cited

U.S. PATENT DOCUMENTS

| | | | |
|---|---|---|---|
| 4,788,674 A | 11/1988 | Maeda et al. | |
| 5,005,164 A | 4/1991 | Sakamoto et al. | |
| 5,249,172 A | 9/1993 | Hagihara et al. | |
| 5,519,680 A | 5/1996 | Honda | |
| 5,841,598 A | 11/1998 | Horiuchi et al. | |
| 6,052,347 A | 4/2000 | Miyata | |

(Continued)

FOREIGN PATENT DOCUMENTS

JP    05-205270    8/1993

(Continued)

*Primary Examiner*—Andrea Wellington
*Assistant Examiner*—Peter Vincent Agustin
(74) *Attorney, Agent, or Firm*—Townsend and Townsend and Crew LLP (57) ABSTRACT

Because a series of data is recorded continuously, the recording quality of data recorded in course of recording cannot be evaluated. Accordingly, the laser output cannot be controlled properly and there are a deterioration and dispersion of the recording quality. Further, when the recording lasts for a long time, the temperature in the vicinity of laser rises due to the heat from the inside of a disc drive and the recording quality is deteriorated.

To solve this, a series of data to be recorded is split and recording is made intermittently in a split data unit. The recording quality is evaluated by reproducing the data recorded nearby before each split data is recorded using a duration and control is performed by reflecting the evaluation result in the laser output so that the recording quality can be maintained satisfactorily over a series of the whole data to be recorded. Further, control is performed so that good recording quality can be maintained even in the recording that lasts for a long time by stopping the function of each part that ought to be operated even at recording or reproduction inside the disc drive in the duration, thereby suppressing a temperature rise.

13 Claims, 4 Drawing Sheets

U.S. PATENT DOCUMENTS 6,282,155 B1 * 8/2001 Takahashi et al. ....... 369/30.23
6,330,392 B1 * 12/2001 Nakatani et al. .............. 386/52
2001/0026517 A1 10/2001 Tsukihashi et al.
2002/0057635 A1 5/2002 Imamura et al.

FOREIGN PATENT DOCUMENTS

| JP | 07-244930 A | 9/1995 |
| JP | 09-282665 A | 10/1997 |
| JP | 2000-182245 A | 6/2000 |
| JP | 2001-034947 | 2/2001 |
| JP | 2001-160265 A | 6/2001 |

* cited by examiner

FIG. 1

FIG. 2

INTERMITTENT OPTICAL DISC RECORDING METHOD AND OPTICAL DISC DRIVE SPLITTING DATA

CROSS-REFERENCE TO RELATED APPLICATION(S)

This is a continuation of U.S. application Ser. No. 10/095,663 (now U.S. Pat. No. 6,954,411), filed on Mar. 8, 2002, and entitled "Optical Disc Recording Method and Optical Disc Drive" which application claimed priority from Japan Patent Application No. 2001-348166, filed Nov. 14, 2001.

BACKGROUND OF THE INVENTION

A conventional optical disc drive made recording in accordance of a recording method specified in a standard. Further, even in a recording method of a conventional disc drive, before recording was made, a test pattern was recorded in the trial write area on a disc using various types of laser power and an output value that is suitable for laser was fixed based on the reproduction result of the test pattern.

However, in the recording method as specified in the standard, a problem occurred in some cases according to the type of the disc, the shape of the drive, or the data recorded in the disc.

Usually, the sensitivity of a disc to laser beam is not uniform over the whole disc surface. Further, laser has a characteristic that the laser is subject to the influence of ambient temperature by the heat the laser itself emits and the heat generated from a disc drive circuit and the output changes.

Based on this characteristic, a recording method of Disc at Once specified in the standard and the point at issue are described.

This Disc at Once recording method is used, for example, when data, such as a video and an audio, is recorded in a DVD-R and the recording data realizes reproduction compatibility in a DVD video player. Further, this recording method specifies that data is continuously recorded without being interrupted halfway from the external surface to the internal surface of a disc.

Accordingly, in this recording method, recording must be continued without evaluating the sufficient recording quality of recorded data until all data is recorded. The reason why the recorded data cannot be evaluated sufficiently is that usually, a recording head and a reproducing head are integrated in an optical disc drive.

The most reliable method for evaluating recording quality is to reproduce recorded data. However, in a head that shares recording and reproduction, the reproduction can be made only when the recording is stopped. Accordingly, because a conventional optical disc drive cannot interrupt the recording in the recording method, such as above Disc at Once, reliable recording quality is not evaluated. Accordingly, it was difficult to maintain appropriate recording quality concerning the whole data that was recorded.

When the size of a series of data to be recorded is large and continuous recording lasts for a long time in particular, sufficient recording quality cannot be evaluated in course of recording. Accordingly, the laser output cannot be controlled appropriately and there was a problem of the deterioration or unevenness of recording quality. Further, because the temperature inside a disc drive becomes extremely high due to continuous recording, laser cannot be used under good temperature characteristics. Accordingly, the maintenance of the recording quality was difficult. Further, the maintenance of the recording quality was difficult in a compact disc drive of which the mounting of a cooling means, such as a fan, also causes a cost increase and that has no room for space and is limited in a power supply.

There were some conventional disc drives, for example, as disclosed in Japanese Unexamined Patent Publication No. 2001-34947, that execute recording and making adjustments so as to satisfy the optimum recording condition evaluating recording quality. However, these conventional disc drives made the adjustments between recording and recording choosing a period during which data is not transferred from a host machine connected to a disc drive.

However, when the data is transferred incessantly from the host machine, such as in Disc at Once recording, the recording must be continued incessantly. Accordingly, it was difficult to make a recording in a good recording condition after the recording quality is checked sufficiently during that time.

This was a problem when real time data, such as a video and an audio, is recorded in particular. When the real time data is recorded, the recording data itself that is recorded becomes an original source. That is, after all data have been recorded, it is impossible to evaluate recording quality, and to redo the recording from the beginning if the recording quality is bad. Because of such reason, the conventional disc drive could not take corrective action for real time recording. Further, even in the case of non-real time recording that enables undoing of recording, the time for undoing the recording occurs. In a medium, such as a DVD-R, in which a disc enables recording only once, a new disc is required.

As described above, when a series of data, such as Disc at Once recording, must be recorded continuously in particular, such Disc at Once recording, it was difficult for a conventional disc drive to satisfactorily maintain the recording quality of the whole recorded data. Further, accordingly, the real time recording of a video and an audio in which the recording data itself becomes an original source at once is not suitable for a recording method, such as the Disc at Once recording, in which a series of data must be recorded continuously. The recording of real time data into a disc, such as a DVD-R in particular, in which recording is enabled only once was difficult.

SUMMARY OF THE INVENTION

One issue of the present invention is to solve the above point at issue that occurs when data in which it specifies that a series of data, Disc at Once recording, is recorded continuously in a conventional disc drive is recorded.

Further, the other issue of the present invention is about to solve is to realize the recording of real time data and the recording for a disc medium of which the recording is enabled only once in good recording quality by solving the above point at issue.

Accordingly, the present invention evaluates the recording quality of data recorded at a moderate time in course of recording and reflects the result in the laser output. A conventional disc drive records a series of data continuously as specified in a standard, whereas the present invention splits a series of data to be recorded and makes a recording intermittently in a unit of split data. As a result, control is performed so that a series of data recorded can be produced in the same manner as when data was recorded continuously. Subsequently, control is performed so that the recording quality can be maintained satisfactorily over a series of the whole data to be recorded by reflecting the result in the laser output of the next data recording based on the recording state of the data reproduced by reproducing the data that was recorded before each data that was split using a duration obtained by the intermittent recording is recorded. Further, control is performed so that good recording quality can be maintained even in the recording lasting for a long time by stopping the function of each part inside a disc drive within the duration or disconnecting the power to suppress the temperature rise inside the disc drive and thereby decreasing a laser output change. Moreover, a series of data in which recording data is data to be recorded continuously in a standard is split and recording is made intermittently in the split unit.

BRIEF DESCRIPTION OF THE DRAWINGS

Preferred embodiments of the present invention will be described in detail based on the followings, wherein.

DESCRIPTION OF THE PREFERRED EMBODIMENTS

Figure 1:
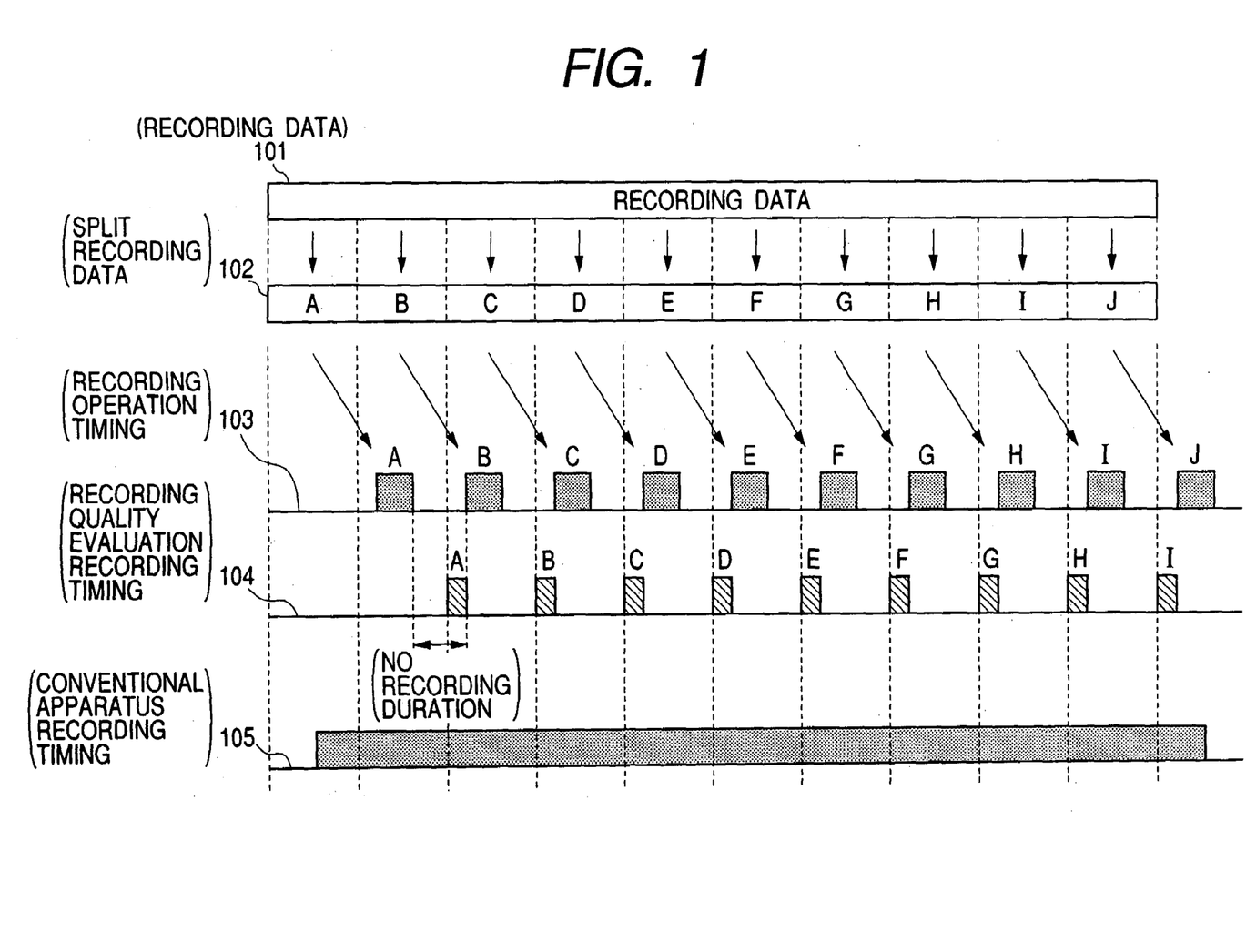
FIG. 1 is a drawing showing a data recording procedure that used a duration for intermittent recording operation in a first embodiment of the present invention.

An embodiment of a data recording method for an optical disc of the present invention is shown in FIG. 1.

In FIG. 1, 101 are a series of recording data to be recorded continuously in a standard. For comparison, 105 show the recording timing of a conventional disc drive. In the conventional disc drive, as shown in 105, when a part of the data to be recorded in the disc drive is accumulated, the sequentially accumulated data is recorded continuously without interrupting recording halfway.

On the other hand, in this embodiment, as shown in 102, the recording data 101 is split and managed in a fixed recording unit. For example, in a DVD-R, the data is split in a unit multiplied by an integer of an ECC block unit and recorded. In FIG. 1, the data is split into ten of A to J as an example. The split recording data 102 of the A to J that was split is split and recorded intermittently at the timing shown in 103. The reason why the recording period of each split data becomes shorter than the width of each split data is that recording is made by accumulating the recording data input to a disc drive in a data buffer once and subsequently fetching the data from the data buffer at the speed that exceeds the input speed of the data input to the data buffer of the disc drive.

When real time data, such as a video and an audio, is recorded, because the speed of the data recorded in the disc is faster than the input speed of the data input to the data buffer, intermittent recording is enabled. A recording duration can be provided in the intervals between the recording and the recording of each split data by making the intermittent recording shown in 103. 104 shows the timing at which recorded data is reproduced and the recording quality is estimated using a part of this recording duration. FIG. 1 shows that each split data of A to I recorded near by respectively, for example, immediately before each split data 102 of B to J is recorded and the recording quality is evaluated. Thus, because the recording quality of recorded data can be evaluated using a recording duration while a series of data is being recorded, the result can be reflected in the laser output adjustment of the next data recording. Accordingly, data can be maintained in good recording quality over a series of the whole data. Hereupon, it is evaluated that the data recording quality is checked and evaluated and the recording state is judged, analyzed, and investigated.

Further, the function of each part inside the disc drive can be stopped in course of a recording duration. This suppresses the power consumption of the whole disc drive and makes the temperature rise inside the disc drive slow, thereby enabling the suppression of a temperature rise and use of laser for a long time under good temperature characteristics.

However, there is the point at issue that because a series of data is not recorded continuously as specified in a standard, link recording is made every split unit, thereby generating a joint.

However, concerning this, in the link recording technology used in a disc drive usually at present, recorded data and the data linked with it can realize the link recording with an error of several bytes. Further, the error caused by the link recording is within the range in which data is sufficiently corrected with an error correction symbol recorded at the same time when the data is recorded. Accordingly, the recorded data can be Reproduced in the same manner when recording was made continuously, thereby causing no problem.

As described above, in the recording method of this embodiment, although a recording joint is generated, the recorded data is reproduced in the same manner when the recording that is made by a conventional disc drive was made continuously. Further, because the laser output can be adjusted so that the recorded data can meet a periodically suitable recording condition, good recording quality is obtained over a series of the whole data to be recorded. Further, because the temperature rise inside the disc drive can be suppressed by stopping the function of each part in course of intermittent recording operation by the intermittent recording operation, laser can be used tinder good temperature characteristics even in the recording that lasts for a long time, the good recording quality can be maintained.

Accordingly, the recording method and drive of this embodiment are suitable for a low-priced disc drive and a portable compact disc drive that cannot mount a cooling means, such as a fan. Further, these disc drives are useful because in most cases, the recording time lasts for a long time and recording can be made under a stable recording condition concerning real time recording, such as a video and an audio, that will not be undone. Further, even in the case of non-real time recording, because recording quality is maintained satisfactorily even if recording is made for a long time, those disc drives are also suitable for the recording into a Write Once medium, such as a DVD-R, that can be recorded only once.

Besides, in a standard, a series of data to be recorded continuously indicates the data in such recording method as this Disc at Once. Accordingly, for example, even for a medium, such as a DVD-RW, that enables rewriting, the same case applies when the Disc at Once recording is applied. In the Disc at Once recording in which data is a series of data to be recorded continuously regardless of which medium, the same case applies when a series of data is split and recorded and the split and recorded data is recorded continuously as a result. Further, the reason why a series of data is split and recorded is that the laser output that records data in an intermittent recording period is adjusted and good recording quality is maintained over the whole surface of an optical disc.

Hereupon, the adjustment of the laser output that records the above data can also be the adjustment of the power and the length of the laser irradiation time or their combination.

Further, an advantage of the recording method of this embodiment is that recording quality is evaluated in the vicinity of the area in which recording is made actually. This is suitable for corresponding to the dispersion of recording sensitivity on a disc surface. Further, when the recording quality is evaluated, a test pattern is not recorded, but the recording quality is evaluated according to the data recorded actually. Accordingly, whenever the recording quality is evaluated, because a recording head needs to move to the test write area and the test pattern needs to be recorded, the recoding quality can be evaluated in an extremely short time. Further, because the positioning of the head into the recording start position is performed by reproducing the data recorded nearby, for example, immediately before each split data is recorded, thereby enabling efficient processing. Concerning an actual recording quality evaluation method, error rates, jitters, and asymmetries of the reproduction data used usually in a conventional disc drive ought to be measured.

Figure 2:
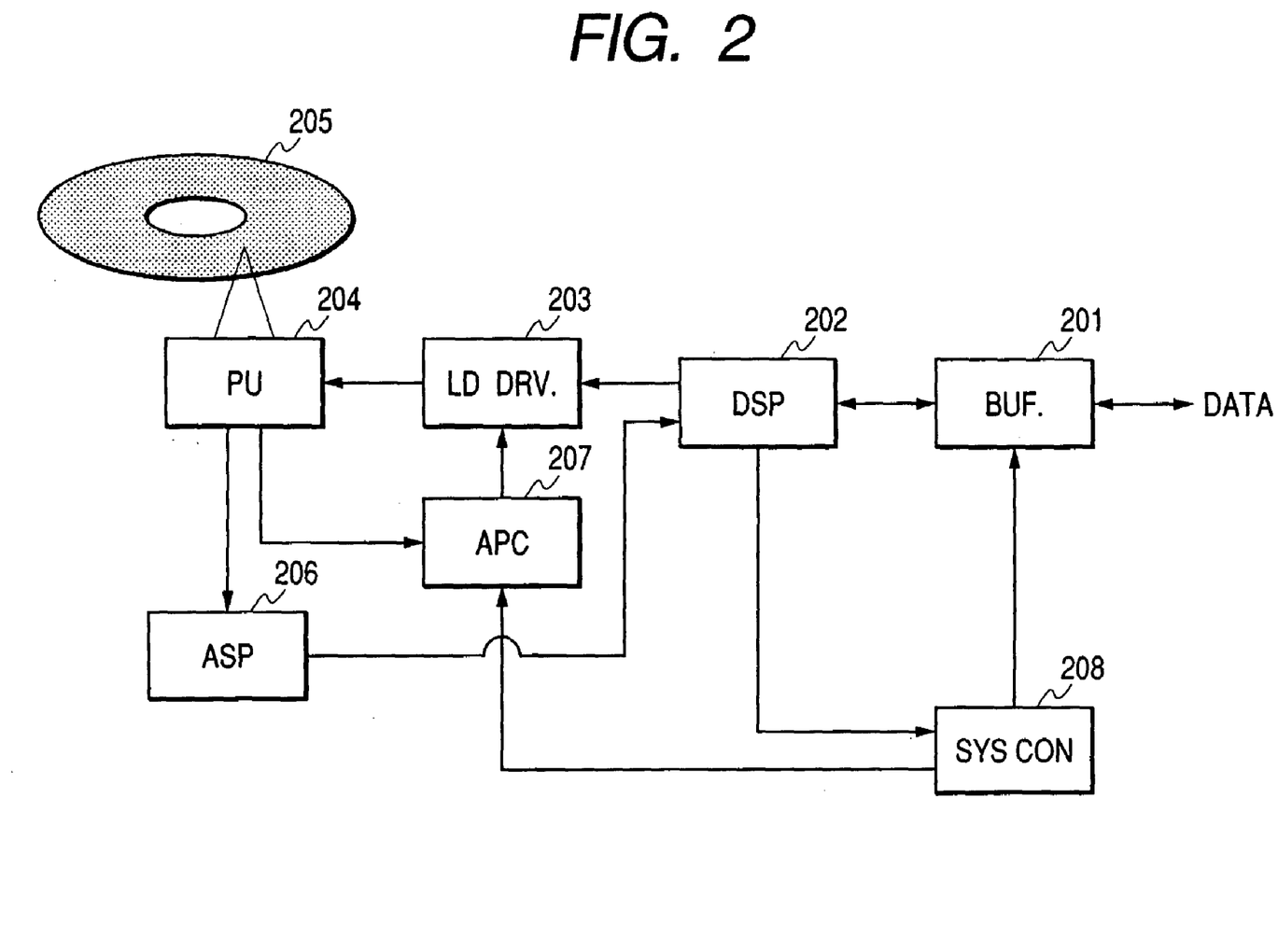
FIG. 2 is a block diagram of a disc drives in the first embodiment of the present invention.

A means for implementing the recording method of this embodiment shown in FIG. 1 is shown in FIG. 2 below.

FIG. 2 shows a part of the configuration of a general disc drive. Because the present invention relates to a recording method, the recording method is implemented by inventing the control method according to the configuration of a conventional disc drive. Accordingly, an explanation of the configuration concerning the whole disc drive is omitted and an implementation means of this embodiment is described using only the site related to this embodiment.

In FIG. 2, 201 is a data buffer. The data buffer temporarily accumulates data input to a disc drive until it records the data in a disc. Further, the data buffer temporarily accumulates the data reproduced from the disc when it sends the data to a host machine connected to the disc drive. Besides, the data buffer 201 consists of many memories and has the configuration in which data is input to and can be output from them. 202 is a digital signal processing mean (hereinafter referred to as a DSP). The DSP adds error corrections to the data transferred from the data buffer 201 and encodes the data in a data format for recording the data in the disc actually. Further, the DSP decodes a signal reproduced from the disc, performs error corrections, and calculates an error rate of reproduction data at the same time. Further, the DSP detects an address on the disc based on the reproduction signal from the disc. 203 is a laser driver. The laser driver drives laser and emits light based on the data transferred from the DSP 202. 204 is an optical pickup. The optical pickup mounts the laser inside and irradiates an optical disc with recording laser beam and reproduction laser beam. Further, the optical pickup detects reflected light from the disc and converts it to an electrical signal. Further, the optical pickup takes out a part of the laser exit beam and outputs a monitor signal for monitoring the laser output. 205 is an optical disc for recording data. 206 is an analog signal processing means (hereinafter referred to as an ASP). The ASP adjusts and binarizes the amplitude and phase of the reproduction signal from the optical pickup.

207 is an automatic laser output adjustment means (hereinafter referred to as an APC). The APC monitors an output monitor signal of the laser output from the optical pickup 204 and controls a laser driver at any time so as to become the set target output. 208 is a system controller that manages and controls each part inside the disc drive.

Besides, the DSP 202, the ASP 206, the APC 207, and the system controller 208 can also be circuits or can also be processed using microcomputer software.

The functions of the system controller 208 concerning this embodiment are as follows.

The accumulation amount of the recording data accumulated in the data buffer 201 is monitored and appropriately records the data in the disc 205.

The function stop and function start of each part inside the disc drive or the power on and power off of each part are controlled and the power consumption of each part is controlled.

The data recorded nearby is reproduced and an error rate is calculated by the DSP 202 based on the reproduced data.

Based on the error rate, an output target value of the laser that records the data followed up by the APC 207 is set.

Figure 3:
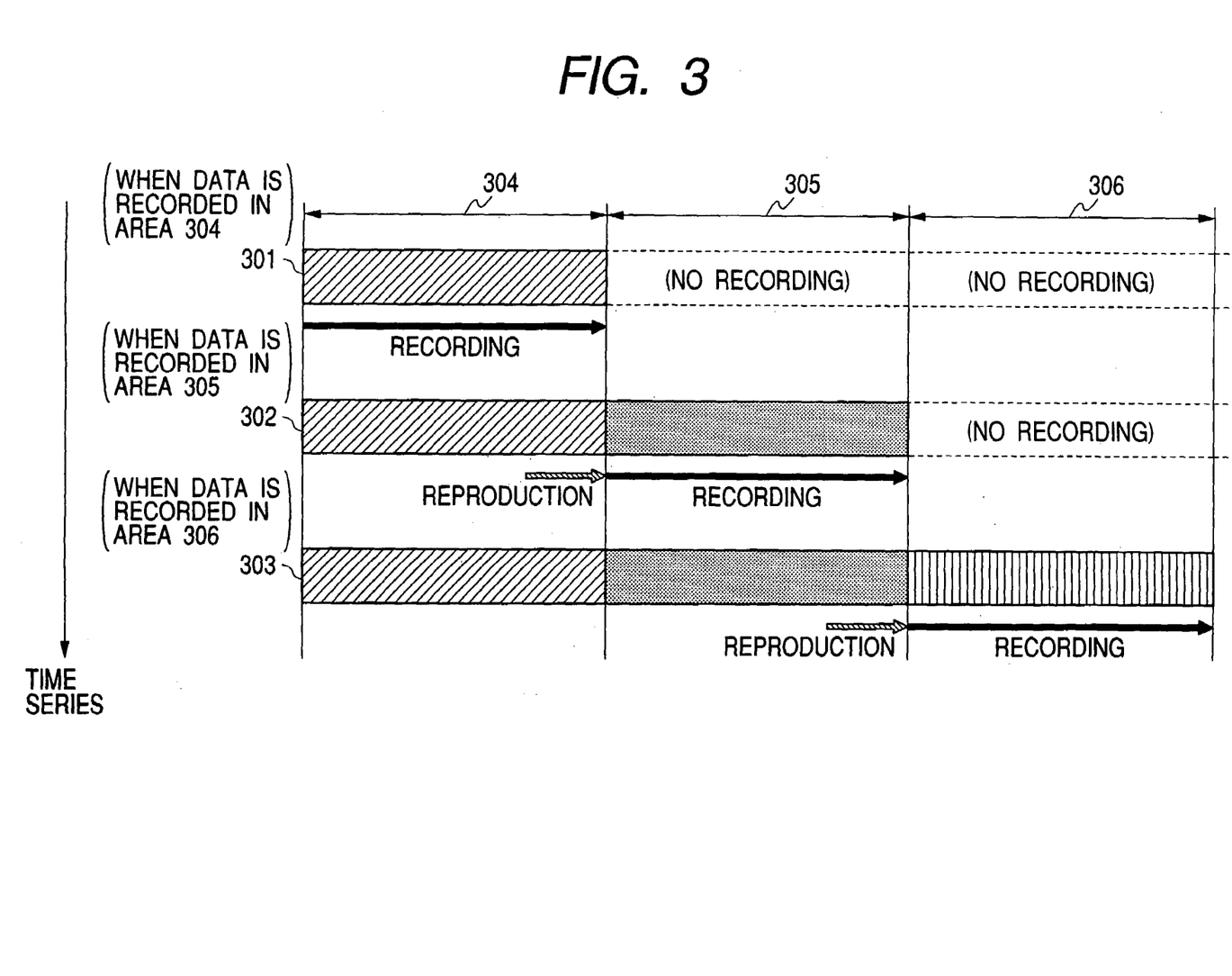
FIG. 3 is a drawing showing a disc recording method for describing an operation procedure of the disc drive in the first embodiment of the present invention.

Subsequently, FIG. 3 describes the operation of each part for implementing the recording method of the present invention by the disc drive shown in FIG. 2 giving itself as an example. FIG. 3 shows a state in which the split data 102-A, -B, and -C shown in FIG. 1 are sequentially recorded in continuous areas 304, 305, 306 on the disc 205 by the intermittent operation respectively. Besides, the laser output when recording is made in the area 304, (data that is recorded first), is adjusted to appropriate output by previously recording a test pattern using various types of laser output in the test write area on the disc in the same manner of a conventional disc drive and reproducing the test pattern. Further, the data recorded in the disc is input from the host machine connected to the disc drive.

First, a series of data to be recorded is transferred from the host machine to the disc drive. When the specified amount of data is accumulated in the data buffer 201, the system controller 208 specifies this as the split data 102-A. The system controller 208 sends the split data 102-A accumulated in the data buffer to the DSP 202 to record the split data 102-A and at the same time positions the optical pickup 204 in front from the head front of the area 304 on the disc 205 (the feed mechanism of the optical pickup 204 is not shown). Besides, the data transfer rate from the data buffer 201 to the DSP 202 needs to sufficiently exceed the data transfer rate from the host machine to the data buffer 201, and in this embodiment, the condition is satisfied. Subsequently, when the position (address) of the optical pickup 204 is sequentially detected by the DSP 202 and the optical pickup 204 reaches the head of the area 304 on the disc 205, the laser driver 203 drives the optical pickup 204 based on the recording data output from the DSP 202 and the split data 102-A is recorded in the area 304 on the disc 205.

When the split data 102-A is recorded in the area 304 on the disc 205, the system controller 208 stops the function of each part that ought to operate even at recording or reproduction except the data buffer 201 that receives the data from the host machine or turns off the power. This generates a recording duration. As a result, the recording state of 301 shown in FIG. 3 occurs.

The data from the host machine is accumulated in the data buffer 201 even in the recording duration. Subsequently, when the data reaches a specified amount again, the system controller 208 specifies this as the split data 102-B. To record this, the split data 102-B is transferred to the DSP 202. At the same time, the optical pickup 204 is positioned in front from the head of the area 305 on the optical pickup disc 205, that is, in the vicinity of the end of the area 304.

Further, the system controller 208 reproduces a part of the split data 102-A recorded previously in the area from the vicinity of the end of the area 304 to the head of the area 305, calculates an error rate by the DSP 202, and judges whether the error rate is within the specified range or not. When the error rate is beyond the Specified range, a target output value of the laser followed up by the APC 207 is updated in accordance with the numerical value.

Subsequently, when the optical pickup 204 reaches the head of the area 305 on the optical disc 205, the split data 102-B is recorded in the area 305 on the optical disc 205 actually. As a result, the recording state of 302 shown in FIG. 3 occurs.

When the split data 102-B is recorded in the area 305 on the disc 205, the system controller 208 stops the function of each part that ought to operate even at recording or reproduction except the data buffer 201 that receives data from the host machine or turns off the power. This generates a recording duration again. Subsequently, the data from the host machine is accumulated in the data buffer 201 even in course of a recording duration. Then when the data reaches a specified amount again, the system controller 208 specifies this as the split data 102-C. To record this, the split data 102-C is transferred to the DSP 202. At the same time, the optical pickup 204 is positioned in front from the head of the area 306 on the optical pickup disc 205, that is, in the vicinity of the end of the area 305. Then the system controller 208 reproduces a part of the split data 102-B recorded previously in the area from the vicinity of the end of the area 305 to the head of the area 306, calculates an error rate by the DSP 202, and judges whether the error rate is within the specified range. When the error rate is beyond the specified range, a target output value of the laser followed up by the APC 207 is updated in accordance with the numerical value.

Subsequently, when the optical pickup 204 reaches the head of the area 306 on the optical disc 205, the split data 102-C is recorded in the area 306 on the optical disc 205 actually. As a result, the recording state of 303 shown in FIG. 3 occurs.

When the split data 102-C is recorded in the area 306 on the disc 205, the system controller 208 stops the function of each part that ought to operate even at recording or reproduction except the data buffer 201 that receives data from the host machine or turns off the power. This generates a recording duration again.

Figure 4:
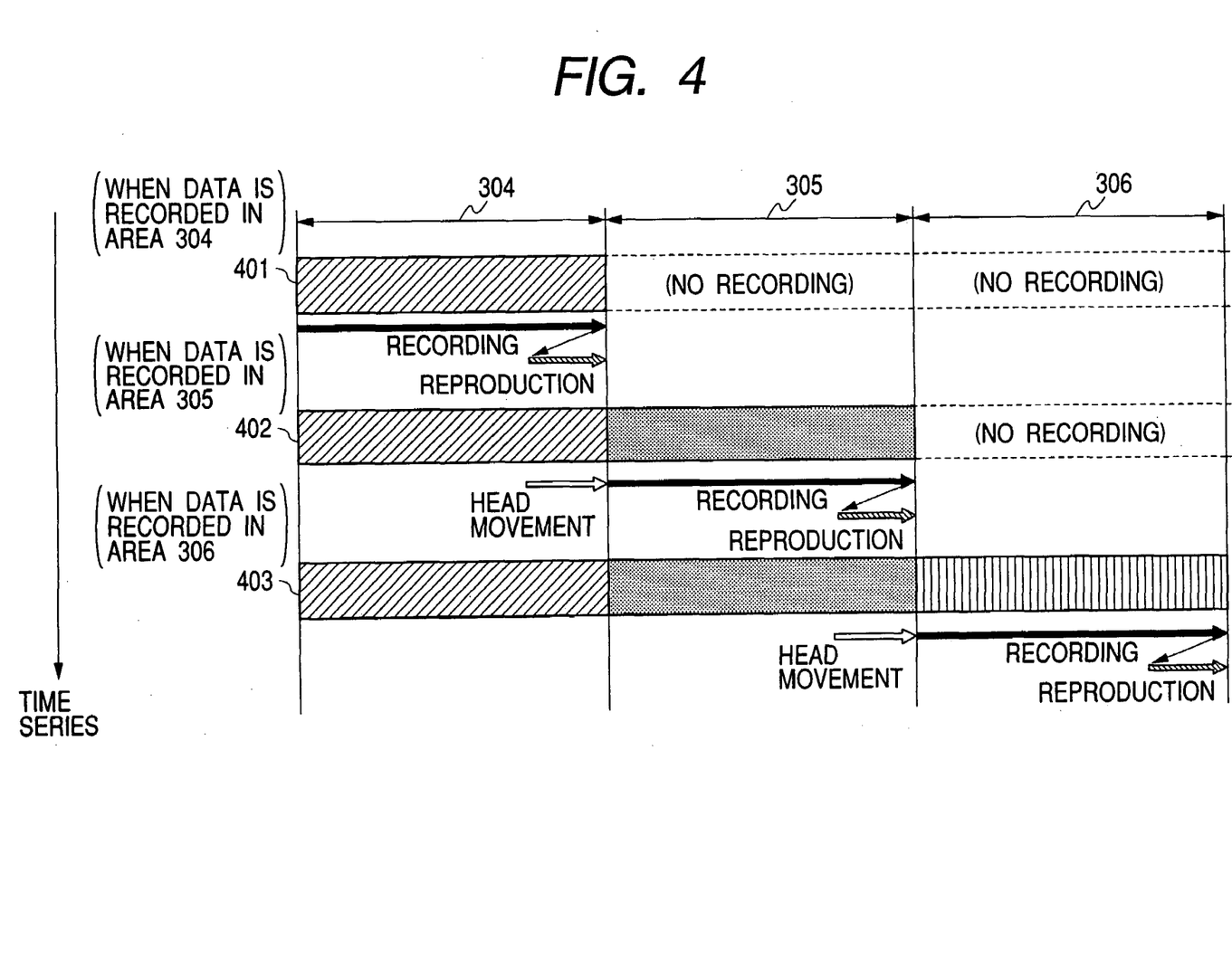
FIG. 4 is another drawing showing the disc recording method for describing the operation procedure of the disc drive in the first embodiment of the present invention.

In FIG. 3, the recording quality of the data recorded nearby was evaluated before each split data is recorded, but, as shown in FIG. 4, the recording quality can also be evaluated by reproducing a part of the data of which the recording is just finished immediately after each split data is recorded. However, although the recording quality can be evaluated even in the procedure shown in FIG. 4, the operation in which the optical pickup is moved after the recording is finished to reproduce the recording data is required.

On the contrary, the recording quality is evaluated intermediately before each split data shown in FIG. 3. Because this can serve both as the operation in which an optical pickup is positioned in the recording start position, processing efficiency is good. Further, both the recording methods shown in FIGS. 3 and 4 reflect the recording quality of the data recorded in the past (for the duration) in the recording condition for new recording. Accordingly, when the possibility of a sudden temperature change occurring in course of the duration needs to be considered, whether temperature is monitored by a temperature sensor and the recording quality of the data recorded in the past is reflected in the recording condition of new recording according to temperature conditions ought to be determined.

The procedure in which the split data 102-A, -B, and -C shown in FIG. 1 are sequentially recorded in the areas 304, 305, 305, and 306 shown in FIGS. 3 and 4 according to the intermittent operation by the disc drive shown in FIG. 2 is described. The data of the split data 102-D and later shown in FIG. 1 are also recorded by repeating the above operation in the same manner. Subsequently, because the recording data is adjusted so that the laser output can be suitable every recording in a split data unit, better recording quality is maintained. Further, because the data used to evaluate recording quality is in the vicinity of an area in which data is about to be recorded, it can correctly remove the recording sensitivity dispersion on the disc surface.

Moreover, because a duration is provided and the power control of each part inside a disc drive is enabled in that duration, the temperature rise inside the disc drive can be suppressed. This can use laser with good temperature characteristics even if the recording lasts for a long time and can maintain good recording quality over the whole data to be recorded.

Besides, in the above description, every time split data is recorded, the laser output was adjusted. However, to prevent a measurement error, the recording in which multiple recording quality measurement results are collectively evaluated and the laser output is adjusted when split data is recorded once multiple times ought to be performed. Further, a temperature sensor is provided in the disc drive. If the temperature in the vicinity of laser can be measured, the output ought also be adjusted with reference to a temperature change width from the preceding adjustment when the laser output is adjusted.

What is claimed is:

1. An optical disc recording method in an optical disc drive for real-time recording of data onto an optical disc comprising:

splitting data that is input to the optical disc drive to produce a plurality of data segments, wherein the optical disc drive comprises a plurality of components, each component being configured to nerform a function:

recording the data segments at a speed that exceeds the speed of the data that is input to the optical disc drive, the recording being performed with a laser;

reproducing previously recorded data during a period of time between recording one data segment and recording a subsequent data segment;

determining a recording condition of the reproduced data based on a reproduction signal corresponding to the reproduced data;

adjusting a recording power level of the laser for recording a next data segment, the recording power level being adjusted based on the recording condition;

recording the data that is input to the optical disk drive by repeating the steps of recording, reproducing, determining, and adjusting; and stopping the function of each component of the optical disc drive except for a recording quality evaluation function and a data buffer receiving function.

2. The optical disc recording method according to claim 1 wherein the previously recorded data is stored on the optical disc at a location proximate a location where the next data segment is to be recorded.

3. The optical disc recording method according to claim 1 further comprising monitoring variations in the temperature of the optical disc drive, wherein whether or not the recording condition of the laser is adjusted is based on variation ranges in the temperature of the optical disc drive.

4. The optical disc recording method according to claim 1 wherein the data to be recorded is a series of data to be recorded continuously in a standard that specifies an optical disc recording method, and this data is split into data segments.

5. The optical disc recording method according to claim 1 wherein control is performed so that the temperature inside the optical disc drive rises slowly and the laser can be used under good temperature characteristics by suppressing the power consumption of the optical disc drive.

6. An optical disc drive that performs real-time recording of data onto an optical disc comprising:
   a plurality of components, each component being configured to perform a function;
   a splitting unit which receives data that is input to the optical disc drive and splits data into plural data segments;
   a recording unit which records the data segments at a speed that exceeds the speed at which the data is input to the optical disc drive, the recording unit including a laser;
   a reproducing unit which reproduces previously recorded data during a period of time between recording one data segment and recording a subsequent data segment;
   a determining unit which determines a recording condition of the reproduced data based on a reproduction signal of the reproduced data;
   an adjusting unit which adjusts the recording power of the laser for recording a next data segment based on the recording condition of the reproduced data; and
   a control unit which stops the function of each component of the optical disc drive except for a recording quality evaluation function and a data buffer receiving function.

7. The optical disc drive according to claim 6 wherein the recording power of the laser is determined for each data segment that is recorded based on a recording condition of previously recorded data.

8. The optical disc drive according to claim 6 wherein the previously recorded data is stored on the optical disc at a location proximate a location where the next data segment is to be recorded.

9. The optical disc drive according to claim 6 wherein the previously recorded data is the data segment that was immediately recorded prior to the next data segment.

10. The optical disc drive according to claim 6 wherein the optical disc is a write-once optical medium.

11. The optical disc drive according to claim 6 wherein the data recorded in an optical disc is one of video data or audio data.

12. The optical disc drive according to claim 6 further comprising a monitoring unit which monitors the temperature of the optical disc drive, wherein whether or not the recording condition of the laser is adjusted is based on variation ranges in the temperature of the optical disc drive.

13. The optical disc drive according to claim 6 wherein the data to be recorded is a series of data to be recorded continuously in a standard that specifies an optical disc recording method, and this data is split.

* * * * *